(12) United States Patent
Thayer et al.

(10) Patent No.: US 7,158,764 B2
(45) Date of Patent: Jan. 2, 2007

(54) SYSTEM AND METHOD FOR SENDING HIGH FIDELITY SOUND BETWEEN WIRELESS UNITS

(75) Inventors: Peter A. Thayer, Noblesville, IN (US); Dale J. Horan, Indianapolis, IN (US); Leonid Shlayen, Huntingdon Valley, IN (US)

(73) Assignee: Electronic Data Systems Corporation, Plano, TX (US)

( * ) Notice: Subject to any disclaimer, the term of this patent is extended or adjusted under 35 U.S.C. 154(b) by 1178 days.

(21) Appl. No.: 10/016,987

(22) Filed: Dec. 13, 2001

(65) Prior Publication Data

US 2003/0114109 A1 Jun. 19, 2003

(51) Int. Cl.
*H04B 1/38* (2006.01)
*H04B 1/18* (2006.01)

(52) U.S. Cl. ............... 455/90.1; 455/41.2; 455/180.1; 455/184.1

(58) Field of Classification Search ............ 455/575.1, 455/90.1, 41.2, 180.1, 184.1
See application file for complete search history.

(56) References Cited

U.S. PATENT DOCUMENTS 4,378,603 A * 3/1983 Eastmond ............... 455/79

5,970,412 A 10/1999 Maxemchuk ............... 455/447
6,763,253 B1* 7/2004 Niehoff et al. ............ 455/575.1
2002/0077072 A1* 6/2002 Suzuki ................... 455/180.1
2003/0098806 A1* 5/2003 Green ........................ 341/144

FOREIGN PATENT DOCUMENTS

DE 100 20 751 A1 5/2001
WO WO 00/70811 11/2000

OTHER PUBLICATIONS

"Specification of the Bluetooth System," Version 1.1, cover page and pp. 45-46, Feb. 22, 2001.

* cited by examiner

*Primary Examiner*—Barry Taylor
(74) *Attorney, Agent, or Firm*—Baker Botts L.L.P.

(57) ABSTRACT

A system and method for sending high fidelity sound between wireless units include the capability to receive audible sounds at a wireless unit and generate signals that represent the audible sounds. The system and method also include the capability to encode a first portion of the signals and encode a second portion of the signals. The system and method further include the capability to transmit the first encoded portion over a first synchronous channel and transmit the second encoded portion over a second synchronous channel.

31 Claims, 3 Drawing Sheets

SYSTEM AND METHOD FOR SENDING HIGH FIDELITY SOUND BETWEEN WIRELESS UNITS

TECHNICAL FIELD OF THE INVENTION

This invention relates generally to wireless communications and, more particularly, to a system and method for sending sound between wireless units.

BACKGROUND OF THE INVENTION

Wireless technologies have the ability to allow data transfer between electronic devices without requiring that the devices be physically coupled together. Accordingly, in today's highly mobile world, using wireless technologies for data transfer is increasingly desirable so that electronic devices can interact with each other without a user having to take the time to physically couple them together or having to transport the proper couplings.

Several short-range wireless technologies are currently under development to accomplish this goal. One such technology that has received considerable interest in the wireless community is known as Bluetooth™. Bluetooth™ technology proposes to use a one megabit per second wireless link that is operable over a distance of approximately ten meters. Additionally, this technology proposes to follow the telephony standard and use a sixty-four kilobit per second channel, which corresponds to an eight kilohertz sample rate using eight bit representations, to send data representing audible sound between wireless units.

Unfortunately, many voice recognition systems require higher fidelity sound than can be provided by an eight kilohertz sample rate using eight bit representations. Additionally, high fidelity music and text to speech conversion may require sample rates greater than eight kilohertz, usually up to sixteen kilohertz. Accordingly, these systems may not be available in this wireless technology.

SUMMARY OF THE INVENTION

The present invention provides systems and methods that substantially reduce or eliminate at least some of the disadvantages associated with previous systems and methods for sending audible sound between wireless units. Accordingly, the present invention provides systems and methods for sending high fidelity sound between wireless units.

In certain embodiments, a system for sending high fidelity sound between wireless units includes an audio interface, a coding module, and a wireless module. The audio interface is operable to receive audible sounds and generate signals that represent the audible sounds. The coding module is operable to encode a first portion of the signals and a second portion of the signals from the audio interface, the audible sounds represented by the first portion and the second portion being encoded at a rate greater than eight kilohertz. The wireless module is operable to transmit the first encoded portion over a first synchronous channel and the second encoded portion over a second synchronous channel.

In particular embodiments, a method for sending high fidelity sound between wireless units includes receiving audible sounds at a wireless unit and generating signals that represent the audible sounds. The method also includes encoding a first portion of the signals and encoding a second portion of the signals, the audible sounds represented by the first portion and the second portion being encoded at a rate greater than eight kilohertz. The method further includes transmitting the first encoded portion over a first synchronous channel and transmitting the second encoded portion over a second synchronous channel.

The present invention has several technical advantages. For example, the present invention allows high fidelity sound to be sent between wireless units. Thus, a second wireless unit may respond to audible commands received at a first wireless unit. Furthermore, high fidelity music may be sent from one wireless unit to another wireless unit. As another example, in certain embodiments, high fidelity sound may be exchanged between two wireless units. Accordingly, a wireless unit that is sending high fidelity sound may also receive high fidelity sound. This may be useful for allowing the exchange of audible commands and/or conversation between wireless units. As a further example, in certain embodiments, two analog signals representing the audible sounds are created, which allows for improved noise cancellation from the audible sounds. Of course, different embodiments of the invention may have none, one, some, or all of these technical advantages and/or additional technical advantages.

Other technical advantages will be readily apparent to those skilled in the art from the following figures, written description, and claims.

BRIEF DESCRIPTION OF THE DRAWINGS

The following figures provide a more complete understanding of the invention, especially when considered in light of the following written description, and its technical advantages.

DETAILED DESCRIPTION OF THE INVENTION

Figure 1:
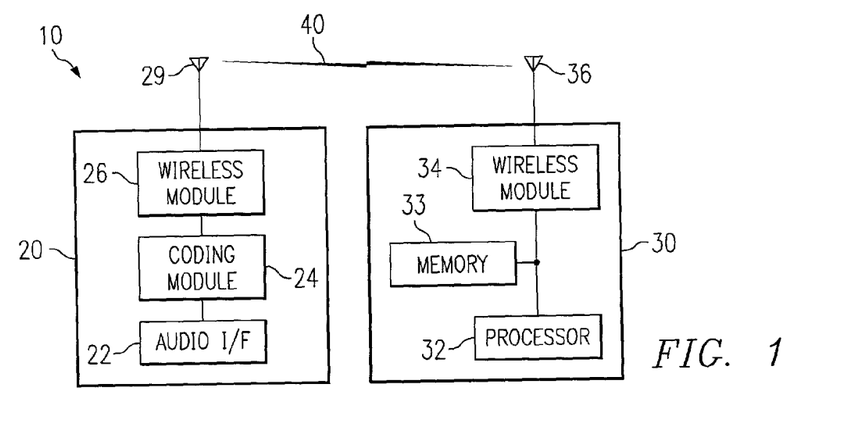
FIG. 1 illustrates a system for sending high fidelity sound between wireless units in accordance with one embodiment of the present invention.

FIG. 1 illustrates a system 10 for sending high fidelity sound between wireless units in accordance with one embodiment of the present invention. As illustrated, system 10 includes a wireless unit 20 and a wireless unit 30, which may or may not be mobile. In general, wireless unit 20 transmits data, including data representing high fidelity sound, to wireless unit 30 over a wireless link 40, and wireless unit 30 receives the data and processes it according to its type. As used herein, high fidelity sound means audible sound representations that contain samples at greater than approximately eight kilohertz. In other embodiments, system 10 may include additional wireless units.

In more detail, wireless unit 20 includes an audio interface 22, a coding module 24, a wireless module 26, and an antenna 29. Audio interface 22 is operable to receive audible sounds from a user of wireless unit 20 and generate signals that represent the audible sounds. Note that audio interface 22 could also detect other sounds in the vicinity of wireless unit 20, such as background noise or music. Coding module 24 is coupled to audio interface 22 and is operable to encode the signals representing the audible sounds into high fidelity representations of the audible sounds, encoded audible sounds being one form of data. In particular embodiments, coding module 24 may also filter the signals for noise. Wireless module 26 is coupled to coding module 24 and is operable to convert the encoded audible sounds into an appropriate format transmission over wireless link 40 and to transmit the encoded audible sounds over wireless link 40 using antenna 29, which is coupled to wireless module 26. To accomplish the transmission, wireless module 26 may establish and utilize multiple wireless channels. For example, in embodiments where wireless unit 20 operates according to the Bluetooth™ protocol, it may establish and utilize two synchronous connection-oriented links. In certain embodiments, wireless unit 20 may also be able to transmit standard or low fidelity sound over wireless link 40.

Wireless unit 30 includes a processor 32, a memory 33, a wireless module 34, and an antenna 36. When wireless unit 20 transmits data over wireless link 40, wireless module 34 receives the data through antenna 36, which is coupled to wireless module 34. Wireless module 34 is operable to convert the encoded data from the wireless format into one acceptable to processor 32. Processor 32, which is coupled to wireless module 34, may then analyze the encoded data according to instructions encoded in memory 33. If the data represents audible sounds, processor 32 determines the audible sounds represented by the data, and hence communicated from the user of wireless unit 20. Processor 32 may accomplish this using interactive voice response (IVR) techniques, voice recognition techniques, or any other appropriate type of audible sound recognition technique. In particular embodiments, processor 32 may also filter the encoded audible sounds for noise. Processor 32 may then generate a command based on the interpreted audible sounds. For example, processor 32 may generate a command to start an application, relay audible messages to wireless unit 20, manipulate an associated electronic device, such as, for example a cellular telephone or personal digital assistant, or any other appropriate type of electronically commanded operation.

In particular embodiments, wireless unit 20 may store encoded audible sounds before transmitting them to wireless unit 20. The stored audible sounds may be received by audio interface 22 and encoded by coding module 24 or otherwise received by the wireless unit 20 in either an encoded or non-encoded format, by wireline or wireless data transfer, for example. Accordingly, wireless unit 20 may or may not include audio interface 22. In general, therefore, the audible sounds may be received by any wireline or wireless input in either an analog or digital format and originate from any source.

In certain embodiments, wireless unit 30 may send audible sounds to wireless unit 20. One example of this would be where processor 32 receives a command to audibly communicate messages, such as, for example, e-mails, to a user of wireless unit 20. To accomplish this, processor 32 would provide encoded audible sounds to wireless module 34, which would transmit them over wireless link 40 using antenna 36. The audible sounds to be transmitted could be received at an audio interface similar to audio interface 22, stored in an encoded format in memory 33, and/or formed by processor 32. For the mentioned example, memory 33 may include text to speech conversion instructions. If received at an audio interface, wireless unit 30 may include a coding module similar to coding module 24 to encode the audible sounds. Moreover, wireless unit 30 may not include processor 32 and memory 33. Wireless unit 20 would receive the encoded audible sounds through antenna 29 at wireless module 26. Coding module 24 may then decode the data representing the audible sounds and send the decoded data to audio interface 22, which would generate audible sounds based on the decoded data. The sound sent by wireless unit 30 may be of low, standard, or high fidelity. In particular embodiments where processor 32 sends audible sounds to wireless unit 20, wireless unit 20 may also include a processor similar to processor 32 to determine the audible sounds being sent and to generate commands based on the audible sounds.

In some embodiments, wireless unit 30 may be able to generate audible sounds for a user of wireless unit 30. In these embodiments, wireless unit 30 could have a coding module similar to coding module 24 and an audio interface similar to audio interface 22. The coding module would decode the data representing the audible sounds and send the decoded data to the audio interface, which would generate audible sounds based on the decoded data. In these embodiments, wireless unit 30 may or may not include processor 32 and memory 33. In a particular embodiment, wireless unit 30 may be able to generate text based on the encoded audible sounds, using any appropriate speech to text conversion technique. This may be useful, for example, if the user of wireless unit 30 is hearing impaired.

The components of wireless unit 20 may have a variety of forms and/or arrangements. For example, audio interface 22 may include microphones, speakers, and/or any other appropriate type of audio input and/or output device. As another example, coding module 24 may include one or more coders, codecs, and/or any other type of device for encoding electrical signals representing audible sounds into data and/or decoding data into electrical signals representing audible sounds. Moreover, the components of coding module 24 may be composed of processors, microcontrollers, application specific integrated circuits (ASICs), field programmable gate arrays (FPGAs), amplifiers, filters, analog to digital converters, and/or any other appropriate type of device for manipulating electrical signals and/or data. As a further example, wireless module 26 may include a transmitter, a transceiver, an oscillator, an envelope detector, and/or any other appropriate device for transmitting and/or receiving data over wireless link 40.

Additionally, the components of wireless unit 30 may have a variety of forms and/or arrangements. For example, processor 32 may include a microprocessor, a microcontroller, an ASIC, an FPGA, and/or any other appropriate device for manipulating data. As another example, wireless module 34 may include a receiver, a transceiver, an oscillator, an envelope detector, and/or any other appropriate device for receiving and/or transmitting data over wireless link 40. As a further example, memory 34 may include read-only memory (ROM), random access memory (RAM), compact-disk read-only memory (CD-ROM), electronically-erasable programmable read-only memory (EEPROM), and/or any other type of electromagnetic or optical volatile or non-volatile data storage device. In some embodiments, all or part of memory 33 may be encoded on processor 32.

Wireless link 40 may be in any appropriate region in the electromagnetic spectrum and may use a stationary or frequency hopped carrier frequency. In embodiments where wireless unit 20 implements the Bluetooth™ protocol, wireless link 40 is frequency hopped in the 2.4 GHz Industrial, Scientific, and Medicine (ISM) band.

Figure 2:
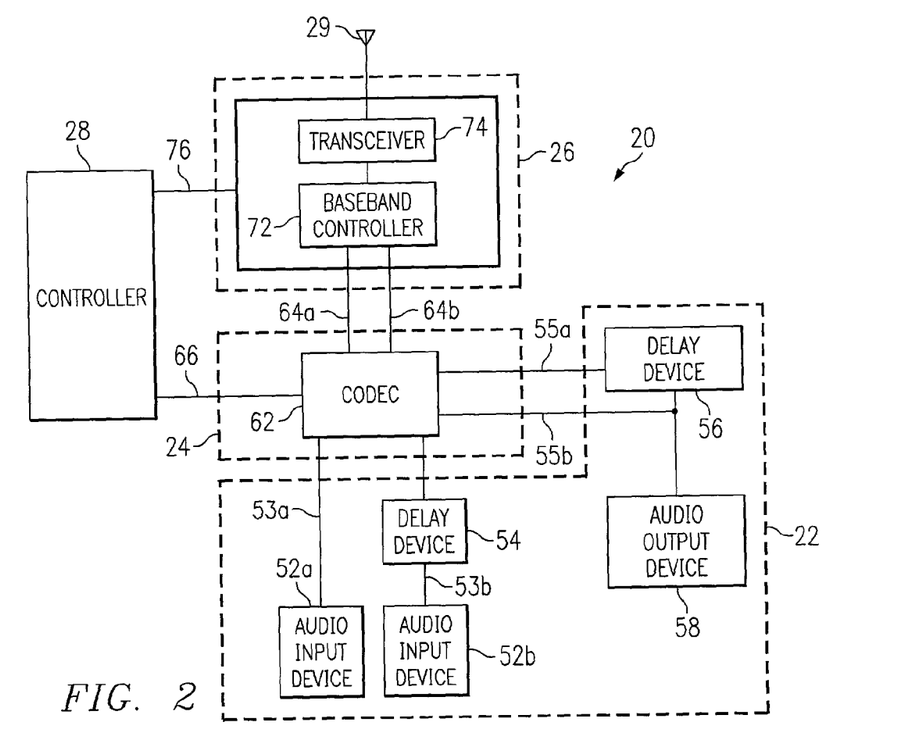
FIG. 2 illustrates one embodiment of a wireless unit in accordance with the present invention.

FIG. 2 illustrates one embodiment of wireless unit 20 in accordance with the present invention. As before, wireless unit 20 includes audio interface 22, coding module 24, wireless module 26, and antenna 29. Furthermore, in this embodiment, wireless unit 20 also includes a controller 28.

Audio interface 22 includes audio input devices 52, links 53, a delay device 54, links 55, a delay device 56, and an audio output device 58. Audio input devices 52 are operable to receive audible sounds and generate analog signals representing the audible sounds. Links 53 couple audio input devices 52 to coding module 24, although link 53b has delay device 54 coupled to it. In turn, links 55 couple coding module 24 to audio output device 58, although link 55a has delay device 56 coupled to it. Audio output device 58 is operable to generate audible sounds based on received analog signals.

Coding module 24 includes a codec 62, links 64, and a link 66. As mentioned previously, codec 62 is coupled to and receives analog signals representing audible sounds from audio input devices 52. Codec 62 is operable to encode the analog signals representing the audible sounds and provide the data to wireless module 26 over links 64. Additionally, codec 62 receives encoded audible sounds from controller 28 over link 66. Codec 62 is operable to provide analog signals representing the encoded audible sounds from controller 28 over links 55.

Wireless module 26 includes a baseband controller 72, a transceiver 74, and a link 76. As mentioned previously, wireless module 26 is coupled to coding module 24 and receives encoded audible sounds from codec 62 at baseband controller 72. Baseband controller 72 is operable to convert the encoded audible sounds into an appropriate format for transmission over wireless link 40, such as, for example, by determining a modulation sequence based on the encoded data, establishing channels for transmitting the data, providing appropriate packaging for the encoded data, and/or performing any other appropriate function. Transceiver 74 is coupled to baseband controller 72 and is operable, based on the data from baseband controller 72, to transmit electromagnetic signals representing the data. Transceiver 74 may accomplish this by, for example, modulating a carrier frequency based on the data. Baseband controller 72 is also coupled to controller 28 by link 76. Baseband controller 72 is operable to receive instructions from and send data to controller 28 over link 76.

As mentioned previously, controller 28 is coupled to codec 62 and baseband controller 72 by link 66 and link 76, respectively. Controller 28 is operable to configure codec 62 and baseband controller 72 for handling data representing audible sound and also to process incoming data over wireless link 40. In certain embodiments, controller 28 is operable to associate encoded audible signals with each other.

In operation, controller 28 determines whether high fidelity sound is to be transmitted. Controller 28 may make this determination by determining what use the receiving wireless unit will make of the transmitted audible sound, by receiving a message from the receiving wireless unit indicating that high fidelity sound is required, by receiving a command from a user of the wireless unit, and/or by any other appropriate process. In certain embodiments, however, controller 28 does not determine whether high fidelity sound is to be transmitted. This may occur, for example, if wireless device 20 always sends high fidelity sound. If high fidelity sound is to be transmitted, controller 28 may then instruct baseband controller 72 to establish wireless channels. In embodiments where wireless module 26 is implementing the Bluetooth™ protocol, baseband controller 72 may accomplish this by requesting, and possibly negotiating, timing, packet type, and encoding type for synchronous connection-oriented links with the receiving wireless unit.

When audio input device 52a receives audible sounds, it generates analog signals representing them on link 53a. Audio input device 52b also receives the audible sounds and generates analog signals representing them on link 53b. However, the analog signals on link 53b are delayed by delay device 54 so that they are out of phase with the analog signals from audio input device 52a when they arrive at codec 62. In particular embodiments, the analog signals on links 53 are one-hundred and eighty degrees out of phase when they arrive at codec 62, although any other appropriate relationship may be used.

Codec 62 may filter the analog signals for noise and encodes the analog signals from audio input device 52a and the delayed analog signals from audio input device 52b. Codec 62 may perform this by sampling the analog signals from each of the audio input devices 52 at a certain rate and generating a digital representation of each sample. In particular embodiments, codec 62 samples each analog signal at approximately eight kilohertz using eight bits to represent the sampled part of the signal. Grouping several samples together would represent a portion of the audible sounds. For example, grouping ten such samples would represent a 1.25 ms portion of audible sound.

Codec 62 provides encoded portions of each analog signal to baseband controller 72 over links 64, link 64a carrying the encoded portions of the signals from audio input device 52a and link 64b carrying the encoded portions of the signals from audio input device 52b. Baseband controller 72 then prepares the encoded portions for transmission over wireless link 40 and sends the prepared encoded portions to transceiver 74. For embodiments in which wireless device 20 implements the Bluetooth™ protocol, baseband controller 72 typically implements the bottom layers of the Bluetooth™ stack, such as, for example, the Logical Link Control and Adaptation Protocol (L2CAP), which is responsible for connection-oriented and connectionless data services to upper layer protocols with protocol multiplexing capability, segmentation and reassembly operations, and group abstraction. Transceiver 74 transmits the prepared encoded portions over the previously established different channels of wireless link 40, one channel for the portions representing the audible sounds from audio input device 52a and one channel for the portions representing the audible sounds from audio input device 52b. Transceiver 74 may accomplish this by, for example, modulating a carrier frequency.

If wireless unit 20 receives audible sounds over wireless link 40, the audible sounds are also encoded in a format for transmission over wireless link 40. Thus, the data representing the audible sounds is received through antenna 29 by transceiver 74, which performs the initial steps in processing of the data, such as, for example, removing a carrier frequency, and sent to baseband controller 72, which converts the audible sounds from the wireless format to an encoded format and provides the encoded audible sounds to controller 28. Controller 28 may then determine whether the received data is encoded audible sounds and provide the data to codec 62 if it is. In particular embodiments, controller 28 may also determine whether encoded audible sounds are related to other encoded audible sounds, from the same channel or from another channel, for example. Controller 28 may determine whether encoded audible sounds are related to encoded audible sounds from another channel by having stored information regarding the establishment of channels for wireless link 40, examining an identifier associated with the encoded audible sounds, or using any other appropriate technique. If controller 28 identifies the encoded audible sounds as being associated with those from another channel, controller 28 provides the encoded audible sounds from both channels to codec 62 over link 66. Upon receiving encoded audible sounds, codec 62 may decode the encoded audible sounds from each channel and generate analog signals representing the encoded data over links 55. The analog signals associated with one of the incoming channels would be output over link 55a, and the analog signals associated with the other channel would be output over link 55b. Thus, the analog signals of one of the channels would encounter delay device 56, which would shift the analog signals to bring them back into phase with the analog signals on link 55b. The analog signals would then be provided to audio output device 58, which would generate audible sounds, such as, for example, monaural or stereo, based on the analog signals. If, however, the encoded audible sounds are not associated with audible sounds from another channel of wireless link 40, controller 28 may send the encoded audible sounds to codec 62 for decoding and output to audio output device 58.

Accordingly, the present embodiment of wireless unit 20 may both send and receive high fidelity sound over wireless link 40. Additionally, in some embodiments, controller 28 may be able to analyze the encoded audible sounds arriving over wireless link 40 to determine the audible sounds that it represents and, hence, whether any commands are being sent to wireless unit 20. Moreover, in particular embodiments, controller 28 may be able to analyze the audible sounds received at audio interface 22 to determine whether speech is present. This may assist in conserving the resources of wireless link 40 if controller 28 is able to restrict the transmission of audible sounds that do not contain speech, such as, for example, background noise.

The components of the present embodiment of wireless unit 20 may have a variety of forms and/or arrangements. For example, audio input devices 52 may be microphones or any other type of device for generating analog signals based on received audible sounds, and audio output device 58 may be a speaker or any other type of device for generating audible sounds based on received analog signals. Links 53 and 55 may be single wire serial links, paired wire serial links, any other appropriate type of serial communication links, or any other appropriate type of link. As another example, codec 62 may be any appropriate type of device for converting analog signals into packet-type data and packet-type data into analog signals. Furthermore, codec 62 may be any industry standard baseband codec device that has a pulse-code modulated output and operates according to any appropriate type of encoding, such as, for example, G.711, G.721, or G.729. In particular embodiments, codec 62 may be composed of two codecs, one for each of audio input devices 52 and/or channels providing encoded audible sounds. In some embodiments, each codec may encode the received analog signals at a rate of approximately eight kilohertz, providing a combined encoding rate of approximately sixteen kilohertz for the audible sounds. Links 64 may be any appropriate type links for conveying pulse code modulated data. As a further example, baseband controller 72 may be any type of device for preparing digital data for transmission over wireless link 40, and transceiver 74 may be any type of device for transmitting and/or receiving electromagnetic signals over wireless link 40. In particular embodiments, transceiver 74 and baseband controller 72 may be part of an ROK 101 007/1 manufactured by Ericsson. As another example, controller 28 may be a microcontroller, a processor having internal and/or external memory, an ASIC, an FPGA, or any other type of device for manipulating data. In particular embodiments, controller 28 may be an HC912D60 manufactured by Motorola. Link 76 may be a universal asynchronous receiver-transmitter link, any other appropriate type of serial communication link, or any other appropriate type of link. Link 66 may be a single wire serial link, any other appropriate type of serial communication link, or any other appropriate type of link.

Accordingly, this embodiment of the present possesses several technical advantages. For example, high fidelity sound may be sent between wireless units. Thus, a second wireless unit may respond to audible commands received at a first wireless unit. Furthermore, high fidelity music may be sent from one wireless unit to another wireless unit. As another example, high fidelity sound maybe exchanged between two wireless units. Accordingly, a wireless unit that is sending high fidelity sound may also receive high fidelity sound. This may be useful for allowing the exchange of audible commands between wireless units. As a further example, two analog signals representing the audible sounds are created, which allows for improved noise cancellation from the audible sounds. A variety of other technical feature exist.

Figure 3:
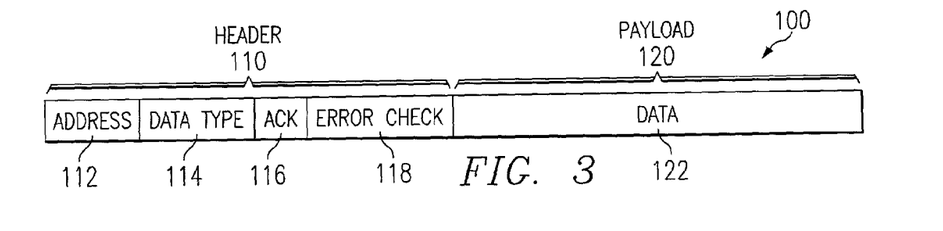
FIG. 3 illustrates a message format for carrying audible sounds over a wireless link.

FIG. 3 illustrates a message format 100 for carrying audible sounds over wireless link 40. Message format 100 includes a header section 110 and a payload section 120. Header section 110 includes an address field 112, a data type field 114, an acknowledgment field 116, and an error check field 118. Address field 112 contains the address of the unit to receive the message. Thus, the receiving unit can determine whether a message is destined for it. Data type field 114 contains an indicator identifying what type of data is included in payload section 120, such as, for example, management data, general data, and/or data representing audible sounds. Acknowledgment field 116 contains an indicator specifying whether a previous message to the unit transmitting the message has been received. Error check field 118 contains data, such as, for example, a check sum or a parity bit, that may be used by the receiving unit to determine whether errors have occurred in header section 110 during transmission. Payload section 120 includes a data field 122, which contains the data, such as, for example, encoded audible sounds, being sent in the message. Accordingly, message format 100 illustrates one type of wireless packaging for encoded audible sounds.

Although message format 100 illustrates one embodiment of a message format that may be used to send audible sounds between wireless units, there are a variety of other message formats that may be used. For example, some message formats may not include data type field 114, acknowledgment field 116, and/or error check field 118. As another example, other message formats may contain an error check field for payload section 120. As a further example, some message formats may include the address of the unit transmitting the message. As an additional example, some message formats may contain a synchronization word and/or a channel identifier. A variety of other examples exist.

Figure 4:
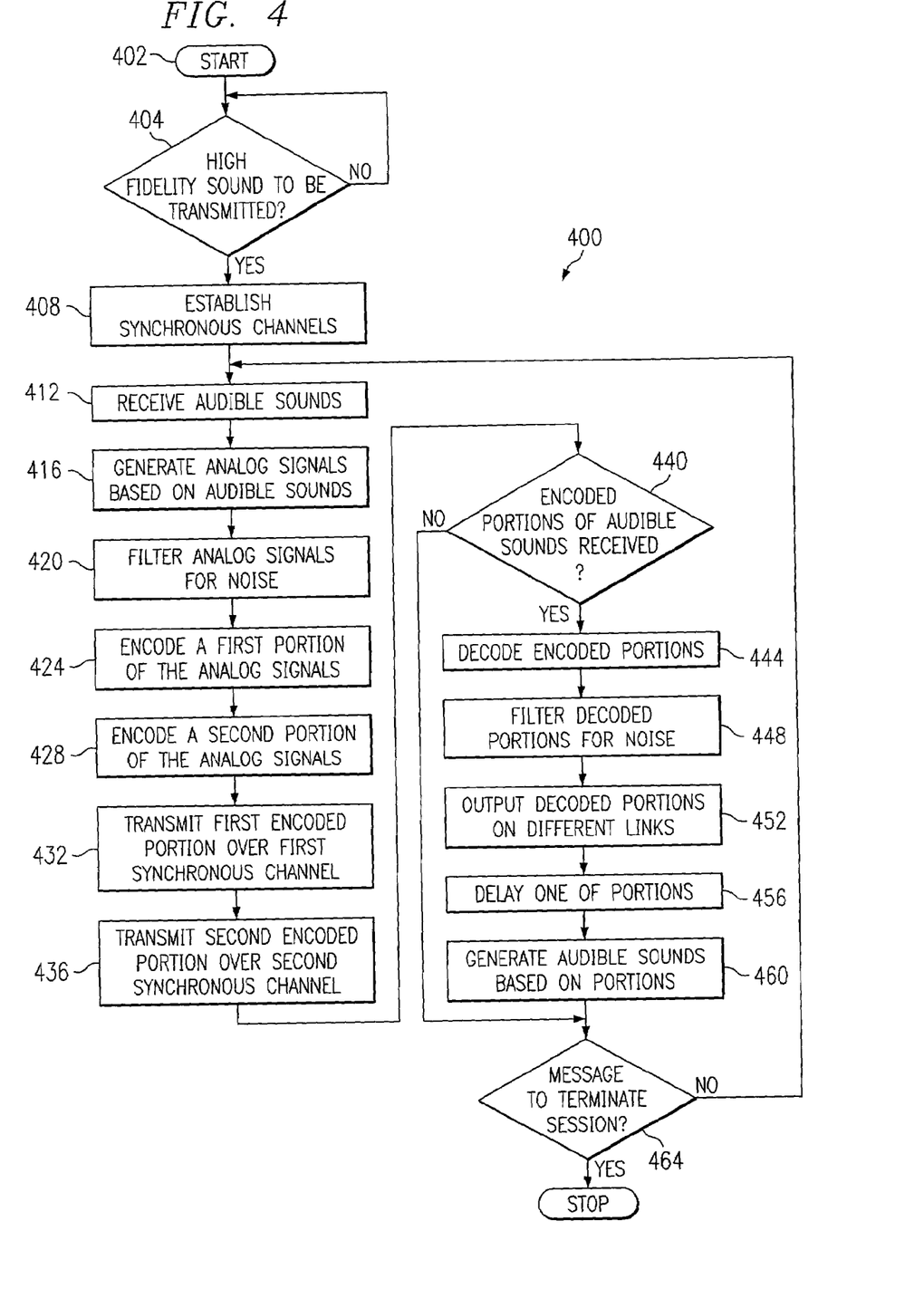
FIG. 4 is a flowchart illustrating a method for sending high fidelity sound between wireless units in accordance with one embodiment of the present invention.

FIG. 4 is a flowchart 400 illustrating a method for sending high fidelity sound between wireless units in accordance with one embodiment of the present invention. The method begins at start block 402, where a session may or may not have already been established between a wireless unit and a receiving wireless unit. At decision block 404, the wireless unit determines whether it should transmit high fidelity sound. The wireless unit may make this determination by determining what use the receiving wireless unit will make of the transmitted audible sound, by receiving a message from the receiving wireless unit indicating that high fidelity sound is required, by receiving a command from a user of the wireless unit, and/or by any other appropriate process. If high fidelity sound is not required to be transmitted, the wireless unit may decide to transmit standard or low fidelity sound. If the wireless unit determines that high fidelity sound should be transmitted, it establishes synchronous channels for the transmission of the high fidelity sound at function block 408. The wireless unit may accomplish this by requesting, and possibly negotiating, timing, packet type, and encoding type for two channels to the receiving wireless unit. When the wireless unit receives audible sounds at function block 412, the wireless unit generates analog signals based on audible sounds at function block 416 and filters the analog signals for noise at function block 420. The analog signals may be filtered for noise by using high pass filters, low pass filters, band pass filters, or any other appropriate type of filters. The wireless unit then encodes a first portion of the analog signals at function block 424 and encodes a second portion of the analog signals at function block 428. For example, the wireless unit could encode a first portion of the analog signals at function block 424 and a second portion of the analog signals that is out of phase with the first portion at function block 428 or encode a first portion of the analog signals at function block 424 and the next portion at function block 428. Each portion may represent the same or a different time segment of audible sounds, on the order of several milliseconds, for example. The wireless device then transmits the first encoded portion over the first synchronous channel at function block 432 and transmits the second encoded portion over the second synchronous channel at function block 436. At function block 440, the wireless unit determines whether encoded portions of audible sounds are being received over the wireless link. If encoded portions of audible sounds are not being received, the wireless unit determines whether there is a message to terminate the session at decision block 464. The message may be generated by the wireless unit, the receiving wireless unit, or the user of the wireless unit. If there is no message to terminate the session, the wireless unit continues receiving audible sounds at function block 412.

Returning to decision block 440, if encoded portions of audible sounds are being received over the channels, the wireless unit decodes the encoded portions of the audible sounds at function block 444 and filters the decoded portions for noise at function block 448. At function block 452, the wireless unit outputs the decoded portions on different links. Then, the wireless unit delays one of the portions at function block 456 and generates audible sounds based on the portions at function block 460. The wireless unit then proceeds to decision block 464.

Although flowchart 400 illustrates a variety of operations for sending high fidelity sound between wireless units, other embodiments may have fewer, more, and/or a different arrangement of operations. For example, in particular embodiments, the wireless unit may not be equipped to receive encoded portions of audible sounds, thus making operations 440–460 extraneous. As another example, in certain embodiments, the wireless unit may receive standard or low fidelity sound and generate audible sounds based on this. As a further example, in particular embodiments, the wireless unit may process the received audible sounds to convert them into text. As an additional example, in some embodiments, the wireless unit may create two analog signals representing the received audible sounds and delay one of the streams before encoding so that a phase difference exists between the streams. As still a further example, in certain embodiments, the wireless unit may not determine whether high fidelity sound is to be transmitted, which may occur, for example, when the wireless unit usually transmits high fidelity sound. Moreover, in some embodiments, the wireless unit may be configured to always transmit high fidelity sound. If the wireless unit transmits high fidelity sound when the receiving wireless unit does not require it, the receiving wireless unit may down sample the encoded audible sounds. A variety of other examples exist.

Figure 5:
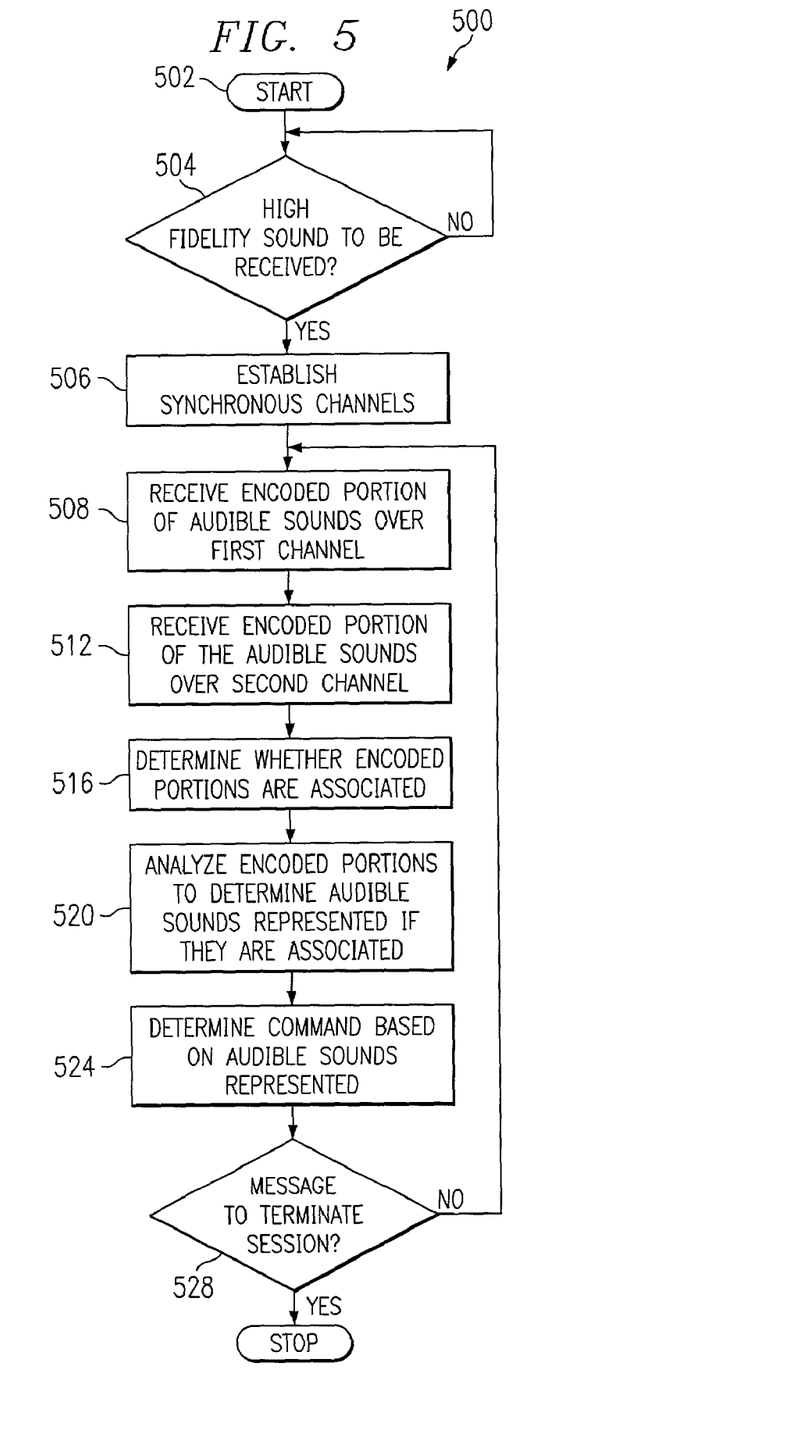
FIG. 5 is a flowchart illustrating another method for sending high fidelity sound between wireless units in accordance with one embodiment of the present invention.

FIG. 5 is a flowchart 500 illustrating a method for sending high fidelity sound between wireless units in accordance with one embodiment of the present invention. The method begins at start block 502, where a session may or may not have already been established between a wireless unit and a transmitting wireless unit. The wireless unit may make this determination by determining what type of audible sound it requires, by receiving a message from the transmitting wireless unit that high fidelity sound is to be transmitted, by receiving a command from a user of the wireless unit, or by any other appropriate process. At decision block 504, the wireless unit determines whether high fidelity sound is to be received. If high fidelity sound is to be received, the wireless unit establishes synchronous channels at function block 506. The wireless unit may initiate the establishment of the synchronous channels or assist the transmitting wireless unit in establishing the synchronous channels. The wireless unit then receives an encoded portion of audible sounds over the first synchronous channel at function block 508 and an encoded portion of the audible sounds over the second channel at function block 512. At function block 516, the wireless unit determines whether the encoded portions are associated. If the encoded portions are associated, the wireless unit analyzes the encoded portions to determine the audible sounds that they represent at function block 520. Then, at function block 524, the wireless unit determines a command based on the audible sounds represented by the received data. The wireless unit may perform this by using any appropriate type of audible sound recognition technique. The wireless unit may, for example, determine that a command to answer a cellular phone has been sent, a command to start an application has been sent, a command to end an application has been sent, and/or any other appropriate command has been sent. At decision block 528, the wireless unit determines whether there is a message to terminate the session. This message could be generated by the wireless unit, the transmitting wireless unit, or a user of the wireless unit. If there is a message to terminate the session, the method is at an end. If, however, there is not a message to terminate the session, the wireless unit continues receiving encoded portions of audible sounds over the wireless channels.

Although flowchart 500 illustrates a variety of operations for a wireless unit sending high fidelity sound between wireless units, other embodiments of the invention may include fewer, more, and/or a different arrangement of operations. For example, the wireless unit may not determine whether high fidelity sound is to be received if high fidelity sound is usually received. As another example, in some embodiments, the wireless unit may generate audible sounds based on the incoming encoded data, by, for example, decoding the data and providing the decoded data to an audio output device. As a further example, in certain embodiments, the wireless unit may also receive audible sounds from a user, encode them, and transmit them to the transmitting wireless unit. A variety of other examples exist.

Although the present invention has been discussed primarily with respect to a wireless unit, sending verbal commands to another wireless unit, the invention is not so limited. In fact, the invention is useful for sending high fidelity sound for a variety of purposes.

Although a variety of embodiments have been discussed with respect to the present invention, a variety of additions, deletions, substitutions, and transformations will be readily suggested to those skilled in the art. Accordingly, the following claims are meant to cover such additions, deletions, substitutions, and transformations.

What is claimed is:

1. A system for sending high fidelity sound between wireless units, comprising:
   an audio interface operable to receive audible sounds and generate first and second analog signals that represent the audible sounds;
   a coding module operable to encode a portion of the first analog signals and a portion of the second analog signals at least in part by:
      receiving the first and second analog signals from the audio interface;
      sampling the first analog signals at a first rate;
      grouping at least two samples of the first analog signals to represent the portion of the first analog signals;
      sampling the second analog signals at a second rate; and
      grouping at least two samples of the second analog signals to represent the portion of the second analog signals, the first and second rates combining to form a rate greater than eight kilohertz such that the audible sounds represented by the portion of the first analog signals and the portion of the second analog signals are encoded at a combined rate greater than eight kilohertz; and
   a wireless module operable to transmit the first encoded portion over a first synchronous channel and the second encoded portion over a second synchronous channel.

2. The system of claim 1, wherein the audio interface comprises:
   a first input device operable to receive first audible sounds and generate the first analog signals, the first analog signals representing the first audible sounds;
   a second input device operable to receive second audible sounds and generate the second analog signals, the second analog signals representing the second audible sounds; and
   a delay device operable to delay the second analog signals from the second input device.

3. The system of claim 2, wherein the first input device is a microphone.

4. The system of claim 1, wherein the coding module comprises:
   a first encoder operable to sample the first analog signals at the first rate and to encode the first portion; and
   a second encoder operable to sample the second analog signals at the second rate and to encode the second portion, the second analog signals encoded by the second encoder being out of phase with the first analog signals encoded by the first encoder.

5. The system of claim 4, wherein the second analog signals encoded by the second encoder are one-hundred and eighty degrees out of phase with the first analog signals encoded by the first encoder.

6. The system of claim 1, wherein the coding module encodes the first and second portions according to G.711.

7. The system of claim 1, further comprising a controller operable to determine whether high fidelity sound should be transmitted and instruct the wireless module to establish the synchronous channels if high fidelity sound should be transmitted.

8. The system of claim 1, wherein the first synchronous channel and the second synchronous channel comprise synchronous connection-oriented links.

9. The system of claim 1, wherein:
   the wireless module is further operable to receive a first encoded portion and a second encoded portion representing audible sounds, the second portion being out of phase with the first portion; and
   the coding module is further operable to decode the first encoded portion and the second encoded portion.

10. The system of claim 9, wherein the coding module is further operable to generate analog signals that represent the audible sounds and send the analog signals from the first portion over a first link and the analog signals from the second portion over a second link, and further comprising:
    a delay device coupled to the first link and operable to delay the analog signals on the first link so that they are in phase with the analog signals on the second link; and
    an audio output device coupled to the first link and the second link and operable to generate audible sounds based on the analog signals on the first and second links.

11. A method for sending high fidelity sound between wireless units, comprising:
    receiving audible sounds at a wireless unit;
    generating first and second analog signals that represent the audible sounds;
    encoding a portion of the first analog signals and a portion of the second analog signals at least in part by:
       sampling the first analog signals at a first rate;
       grouping at least two samples of the first analog signals to represent the portion of the first analog signals;
       sampling the second analog signals at a second rate; and
       grouping at least two samples of the second analog signals to represent the portion of the second analog signals, the first and second rates combining to form a rate greater than eight kilohertz such that the audible sounds represented by the portion of the first analog signals and the portion of the second analog signals are encoded at a combined rate greater than eight kilohertz; and
    transmitting the encoded portion of the first analog signals over a first synchronous channel; and
    transmitting the encoded portion of the second analog signals over a second synchronous channel.

12. The method of claim 11, wherein generating signals comprises delaying the second analog signals so that it is out of phase with the first analog signals.

13. The method of claim 12, wherein the delay results in the second analog signals being one-hundred and eighty degrees out of phase with the first analog signals.

14. The method of claim 11, comprising:
    encoding the portion of the first analog signals at the first rate at a first encoder; and
    encoding the portion of the second analog signals at the second rate at a second encoder.

15. The method of claim 11, wherein the analog signals are encoded according to G.711.

16. The method of claim 11, further comprising:
    determining whether high fidelity sound should be transmitted; and establishing the synchronous channels if high fidelity sound should be transmitted.

17. The method of claim 16, wherein determining whether high fidelity sound should be transmitted comprises receiving a message indicating that high fidelity sound is desired.

18. The method of claim 11, wherein the first synchronous channel and the second synchronous channel comprise synchronous connection-oriented links.

19. The method of claim 11, further comprising:
receiving a first encoded portion and a second encoded portion representing audible sounds, the second portion being out of phase with the first portion;
decoding the first encoded portion and the second encoded portion.

20. The method of claim 19, further comprising:
generating analog signals that represent the audible sounds in the first encoded portion on a first link;
generating analog signals that represent the audible sounds in the second encoded portion on a second link;
delaying the analog signals on the first link to bring them into phase with the analog signals on the second link; and
generating audible sounds based on the analog signals on the first and second links.

21. A system for sending high fidelity sound between wireless units, comprising:
a wireless module operable to:
facilitate establishing a first synchronous channel and a second synchronous channel; and
receive encoded portions of audible sounds over the first synchronous channel and encoded portions of the audible sounds over the second synchronous channel, the encoded portions of the audible sounds having been encoded by:
sampling first analog signals at a first rate;
grouping at least two samples of the first analog signals to represent a portion of the first analog signals;
sampling second analog signals at a second rate; and
grouping at least two samples of the second analog signals to represent a portion of the second analog signals, the first and second rates combining to form a rate greater than eight kilohertz such that the audible sounds represented by the portion of the first analog signals and the portion of the second analog signals are encoded at a combined rate greater than eight kilohertz; and
a processor operable to analyze the encoded portions to determine what audible sounds they represent and to determine a command based on the audible sounds represented.

22. The system of claim 21, wherein the encoded portions from the first synchronous channel are one-hundred and eighty degrees out of phase with the encoded portions from the second synchronous channel.

23. The system of claim 21, further comprising:
a coding module operable to decode the encoded portions into analog signals that represent the audible sounds; and
an audio interface operable to generate audible sounds based on the analog signals.

24. The system of claim 23, wherein:
the audio interface is further operable to receive audible sounds and generate analog signals that represent the audible sounds;
the coding module is further operable to encode the analog signals; and
the wireless module is further operable to transmit the encoded audible signals.

25. The system of claim 21, wherein the synchronous channels comprise synchronous connection-oriented links.

26. A method for sending high fidelity sound between wireless units, comprising:
establishing a first synchronous channel and a second synchronous channel;
receiving encoded portions of audible sounds over the first synchronous channel;
receiving encoded portions of the audible sounds over the second synchronous channel, the encoded portions of the audible sounds having been encoded by:
sampling first analog signals at a first rate;
grouping at least two samples of the first analog signals to represent a portion of the first analog signals;
sampling second analog signals at a second rate; and
grouping at least two samples of the second analog signals to represent a portion of the second analog signals, the first and second rates combining to form a rate greater than eight kilohertz such that the audible sounds represented by the portion of the first analog signals and the portion of the second analog signals are encoded at a combined rate greater than eight kilohertz; and
analyzing the encoded portions to determine the audible sounds represented by the portions; and
determining a command based on the audible sounds represented.

27. The method of claim 26, further comprising:
decoding the encoded portions into analog signals; and
generating audible sounds based on the analog signals.

28. The method of claim 26, further comprising:
receiving audible sounds;
generating analog signals based on the audible sounds;
encoding the analog signals; and
transmitting the encoded audible sounds.

29. The method of claim 26, wherein the encoded portions from the first synchronous channel and the second synchronous channel are out of phase.

30. The method of claim 26, wherein the wireless channels comprise synchronous connection-oriented links.

31. A system for sending high fidelity sound between wireless units, comprising:
an audio interface operable to receive audible sounds and generate analog signals that represent the audible sounds, the audio interface comprising:
a first audio input device operable to receive audible sounds and generate first analog signals that represent the audible sounds,
a second audio input device operable to receive audible sounds and generate second analog signals that represent the audible sounds, and
a delay device operable to delay the second analog signals from the second audio input device so that they are one-hundred and eighty degrees out of phase with the first analog signals from the first audio input device;
a coding module operable to encode a portion of the first analog signals from the first audio input device and a portion of the delayed second analog signals from the second audio input device, the coding module comprising:
a first encoder operable to encode the portion of the first analog signals from the first audio input device according to G.711 at least in part by:

receiving the first analog signals from the audio interface;

sampling the first analog signals at a first rate; and grouping at least two samples of the first analog signals to represent the portion of the first analog signals; and a second encoder operable to encode the portion of the delayed second analog signals from the second audio input device according to G.711 at least in part by:

receiving the second analog signals from the audio interface;

sampling the second analog signals at a second rate; and grouping at least two samples of the second analog signals to represent the portion of the second analog signals, the first and second rates combining to form a rate greater than eight kilohertz such that the audible sounds represented by the portion of the first analog signals and the portion of the second analog signals are encoded at a combined rate greater than eight kilohertz;

a wireless module operable to establish two synchronous connection-oriented links if high fidelity sound should be transmitted and transmit the encoded portions from the first encoder over the first synchronous connection-oriented link and the encoded portions from the second encoder over the second synchronous connection-oriented link; and a processor operable to determine whether high fidelity sound should be transmitted and instruct the wireless module to establish links if high fidelity sound should be transmitted.

* * * * *